May 16, 1944.   H. PELPHREY   2,348,845
MACHINE FOR FORMING GEARS
Filed Oct. 6, 1942   3 Sheets-Sheet 1

INVENTOR
Harry Pelphrey
BY
Harness, Dickey & Pierce
ATTORNEYS.

May 16, 1944.   H. PELPHREY   2,348,845
MACHINE FOR FORMING GEARS
Filed Oct. 6, 1942   3 Sheets-Sheet 2
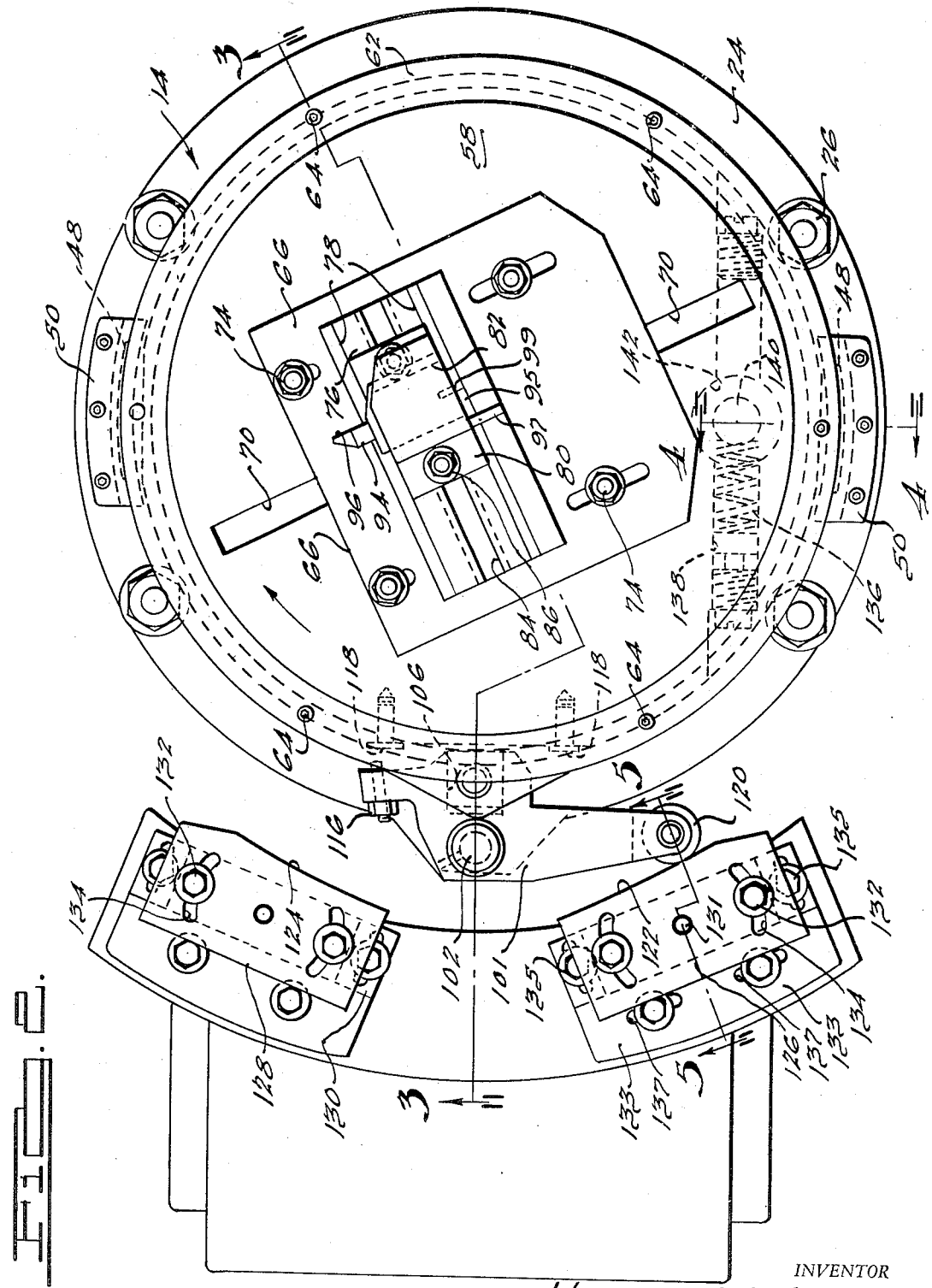
INVENTOR
Harry Pelphrey.
BY Harness, Dickey & Pierce.
ATTORNEYS.

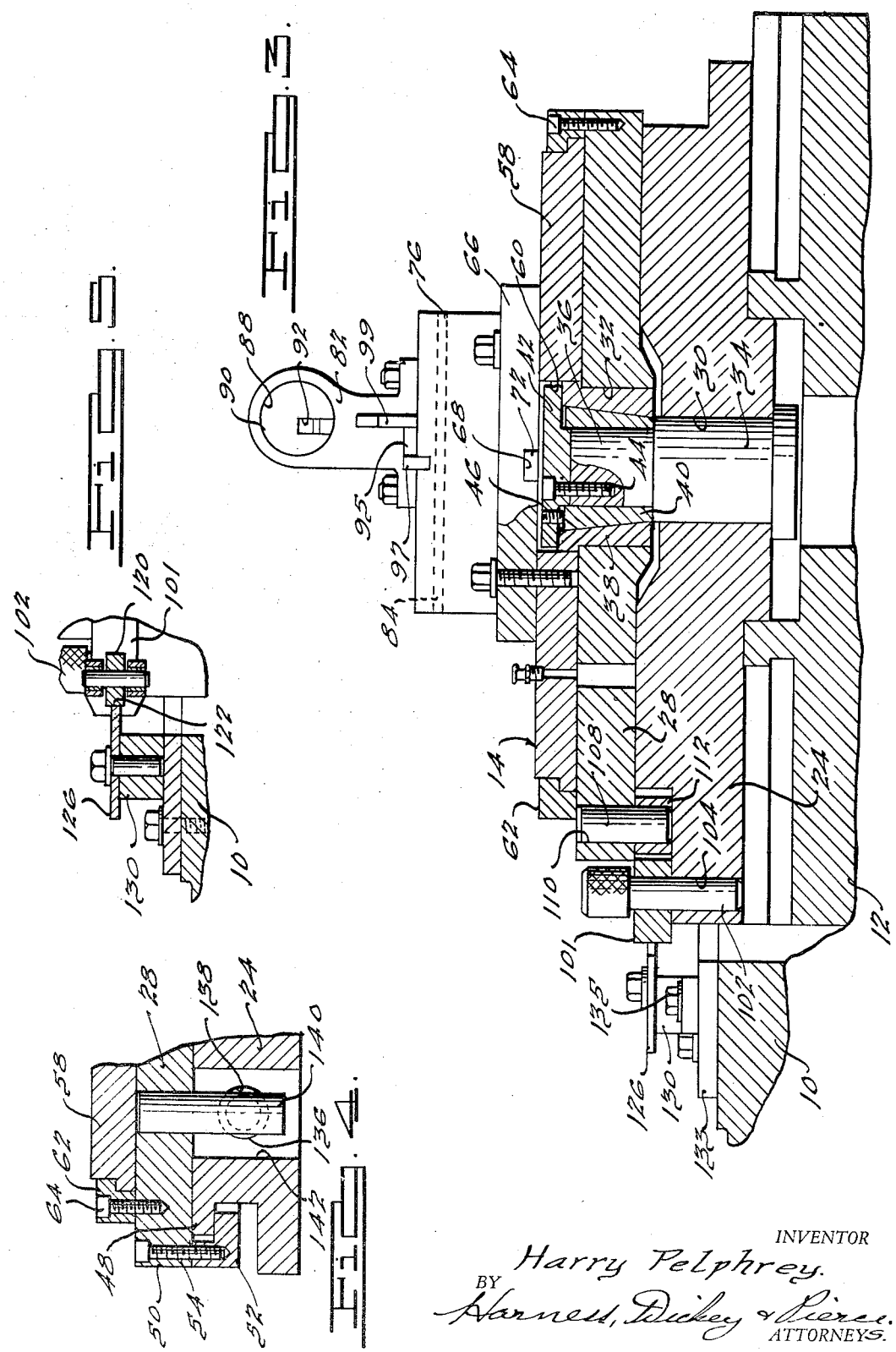

Patented May 16, 1944

2,348,845

UNITED STATES PATENT OFFICE 2,348,845

MACHINE FOR FORMING GEARS

Harry Pelphrey, Detroit, Mich., assignor to Michigan Tool Company, Detroit, Mich., a corporation of Delaware Application October 6, 1942, Serial No. 460,976

7 Claims. (Cl. 90—3)

The present invention relates to improvements in machines for forming worms of the globoidal or Hindley type.

The primary object of the present invention is to provide improvements in machines of the type mentioned in which relief is provided on the thread flanks of worms of the globoidal or Hindley type.

Other objects of the invention will become apparent from the following specification, the drawings relating thereto, and from the claims hereinafter set forth.

In the drawings, in which like numerals are used to designate like parts in the several views throughout:

Fig. 2 is a top plan view of the thread forming means of the present invention;

Fig. 3 is a cross-sectional view taken substantially along the line 3—3 of Fig. 2;

Fig. 4 is a cross-sectional view taken substantially along the line 4—4 of Fig. 2; and Fig. 5 is a cross-sectional view taken substantially along the line 5—5 of Fig. 2.

Figure 1:
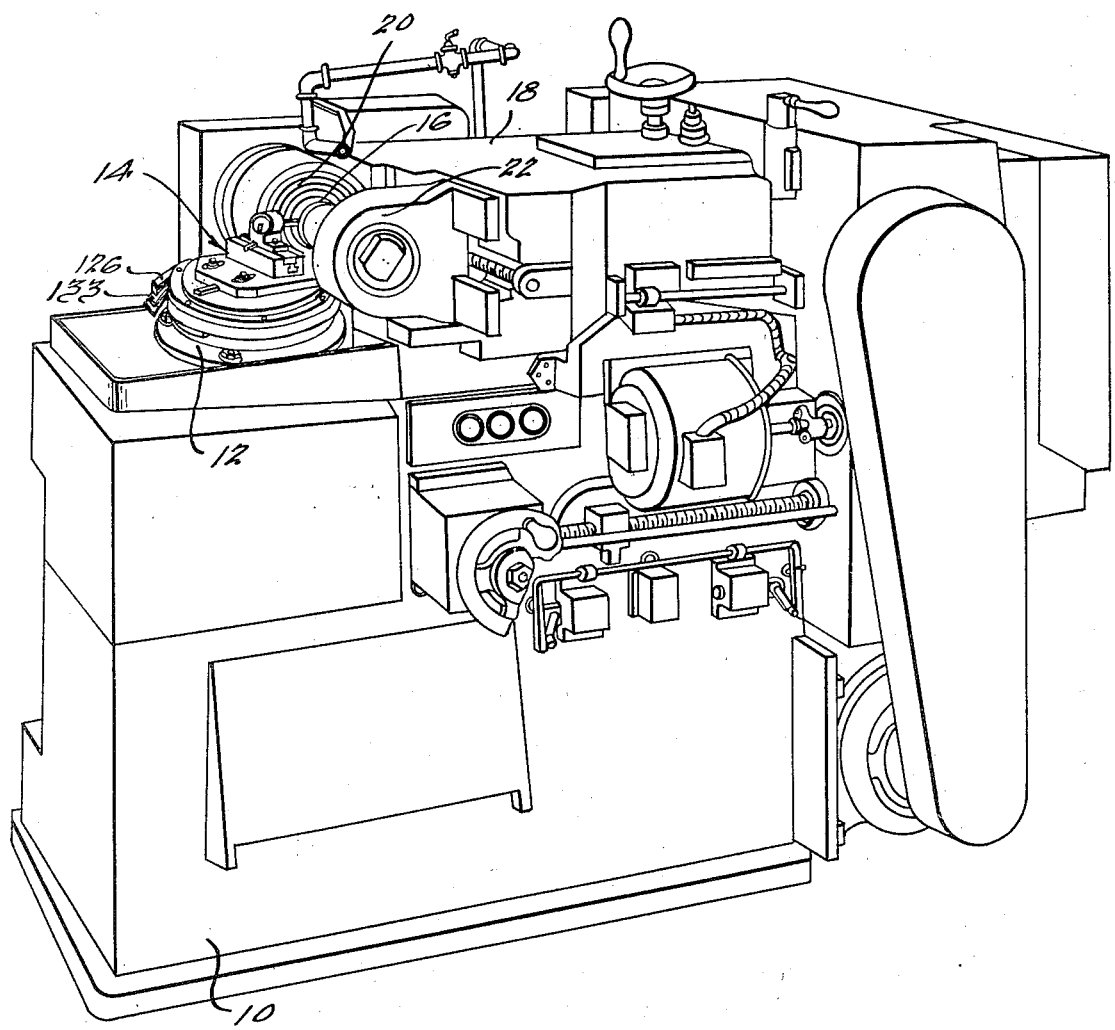
Figure 1 is a perspective view of a machine having the thread forming means of the present invention associated therewith.

The structure of the present invention is particularly adapted for providing the relief in the thread flanks of the worms disclosed and claimed in Scott Patent No. 2,279,414 issued April 14, 1942. In such patent the worm, provided with the end relief on the threads thereof, is disclosed and claimed and the character and importance of such relief is described in detail. In general, the relief provides a modification of the worm thread in that the flanks of the thread adjacent the ends are relieved so that the load may be transmitted to the engaged tooth much more gradually and smoothly. The extent of the relief is gradually reduced from the ends or flanks of the thread toward the center of the worm.

The cutting means of the present invention is mounted upon the vertical spindle of the automatic machine disclosed in Pelphrey application, Serial No. 435,649, filed March 21, 1942. The worm is formed on the machine there disclosed by employing the cutter there disclosed on the vertical spindle. In the machine of the present invention, the cutting means of the present invention then replaces the cutter employed in the machine of the Pelphrey application referred to. The worm is disposed on the horizontal spindle and the cutter of the present invention is operated by the machine described in detail in the application referred to to provide the end relief. The cutter may be positioned at the limit of in-feed and it is only necessary to provide the side feed of the application to provide the relief on the worm threads. The operating elements of the machine of the present invention for operating the vertical and horizontal spindles in synchronism are the same as in the application referred to and reference may be had to such application for a detailed description of such operating means.

Referring to the drawings, an automatically controlled machine is illustrated which comprises a base 10, which serves to mount a vertical spindle having a rotatable work table 12 fixed thereto for rotation therewith. The cutting means of the present invention is generally indicated at 14 and is mounted to table 12 for rotation therewith.

The worm to be formed is indicated at 16 and is mounted to a slide 18 which is mounted on horizontal, parallel ways, formed on the top surface of the base 10 so that such slide is slidable on parallel lines toward and from the work table 12. The side 18 serves to mount a horizontal work spindle 20 upon which is mounted the worm 16. One end of the worm is supported in the head stock 20 and the other end is mounted on a removable tail stock 22.

The cutting means 14 includes a circular plate 24 which rests upon the table 12 and is secured thereto by means of suitable bolts 26, located at spaced intervals therearound. Another plate member 28 is supported upon the top surface of the plate 24 and is mounted for limited relative rotation with respect thereto. The plate members 24 and 28 are provided with axial bores 30 and 32, respectively, therethrough. A headed pivot pin 34 having an upper portion 36 of reduced diameter is received through the aligned apertures 30 and 32 and projects slightly upwardly above the top surface of plate 28. Tapered, annular bearing members 38 and 40 are disposed between the reduced portion 36 and the axial opening 32. The bearing member 38 is fixed to the member 28 for movement therewith; and the bearing member 40 is fixed to the pivot pin 34 by an end cap 42 which is fixed to the reduced portion 36 by means of a screw 44. A set screw 46 is received through the overhanging portion of the cap 42 and is adapted to bear against the top surface of the bearing member 40. The screw 46 may be adjusted to take up wear between the bearings 38 and 40.

The plate member 24 is formed with diametrically opposed bosses 48 which are disposed under diametrically opposed bosses 50 formed on the member 28. L-shaped bearing members 52 are secured to the bosses 50 by means of screws 54 and have portions which extend under the bosses 48 and slidably engage the under surfaces thereof so as to permit rotative movement between the members 24 and 28 but to hold the member 28 against the top surface of member 24.

Another plate member 58 is disposed on the top surface of the plate member 28 and is provided with an axial aperture 60 therethrough which is adapted to bear against the upper peripheral edge of the bearing member 38. The plate member 58 may be rotatively adjusted in its position on the member 28 and is secured thereto by means of a clamping ring 62 which has an inturned flange which engages an annular shoulder on the member 58 to clamp the member 58 in its adjusted position with respect to the member 28. Screws 64 are provided at suitable spaced intervals around the ring 62 which are adapted to be received within tapped openings in the member 28 for tightening the clamp 62 and securing the plate 58 in its adjusted position.

Another mounting plate 66 is slidably disposed on the member 58 and is formed with a key way 68 upon the under surface thereof. Such key way 68 is adapted to be superimposed above key ways 70 formed in the member 58 on opposite sides of the central aperture 60 and extending diametrically therefrom. Keys 72 are received within the key ways 68 and 70, so that the mounting plate 66 may slide relative to the member 58. The member 66 may be fixed in position on the member 58 by means of cap screws 74, which pass through elongated slots provided in the members 66 and which are received within tapped openings in the member 58.

The supporting member 66 has an integral upstanding block 76 on the top surface thereof. The upper surface of such block is formed with parallel sides 78 which provide guideways for the base 80 of a cutter holding member 82. Member 76 is formed with a T-slot 84 transversely thereof which is adapted to receive the heads of screws passed through the base 80 and provided with nuts 86 on the upper ends thereof for the purpose of adjustably fixing the tool holder 82 in its proper position along the member 76. The tool holder 82 is formed with a cylindrical bore 88 extending horizontally therethrough which receives a cylindrical tool holding member 90 therein. Such member 90 snugly fits within the bore 88 and is retained in predetermined angular position by means of suitable set screws. The rotary tool holding member 90 has a tool receiving slot 92 therein, one of the side walls of which lies on a plane through the axis of the tool holding member and intersecting the top wall of the slot at right angles at this axis. A cutting tool 94, having a cutting edge 96, is retained in position in the slot 92 by means of cooperating wedges.

The holder 82 is fixed in position on the member 76 so that the cutting edge 96 of the tool 94 is disposed tangent to the base circle of the worm to be formed with the body of the tool 94 disposed on the inner side of the base circle, to the right of the central position viewing Fig. 2. The correct distance for setting the tool holder so that the cutting edge 96 is tangent to the base circle is determined by a gage block 95, of proper size depending upon the base circle, which is disposed between a center block 97 mounted on member 76 and a stop block 99 mounted in a predetermined position on holder 82.

The relative movement between the members 24 and 28 is imparted to these members by means of a bell crank member 101, which is fulcrumed to a pivot pin 102. The pivot pin 102 is received within an aperture 104 formed in the member 24 adjacent the periphery thereof. The member 101 is formed with an inwardly disposed rectangular aperture 106 in the body thereof adjacent the fulcrum. The member 28 has a depending pin 108 received through an aperture 110 formed therein, and the lower end of such pin 108 is received within an aperture formed in member 112, such aperture being complementary in shape and size to the member 108. The member 112 is rectangular in shape and is slidably received within the recess 106. The member 112 is of such a size with respect to the recess 106 that it may move therein. The body portion of the member 101, having recess 106 formed therein, and the member 112 are received within a recess provided in the top surface of the member 24, so that the member 112 is slidably supported on the top surface of the member 24 and may move within the recess formed therein. One of the arms of the bell crank member 102 has an adjustable set screw 116 passing therethrough. The extent that the set screw 116 projects through the arm may be adjustably varied and the inner end of the set screw is adapted to bear against the hardened head of a stop screw 118 which is set in member 24.

The other arm of the bell crank 101 has a roller follower 120 rotatably mounted thereon, and such roller follower is adapted to engage the cam surfaces 122 and 124 of cam plates 126 and 128, respectively. The cam plates 126 and 128 are pivotally supported upon the top surfaces of blocks 130 by central pivot pins 131. The cam plate may be adjustably fixed to blocks 130 about the pivots 131 by set screws 132 which pass through arcuate slots 134, having the pivots 131 as centers, and are received in tapped openings in members 130. The members 130 rest upon supporting plates 133 and are adjustably fixed thereto by set screws 135 which pass through elongated slots formed in end flanges on members 130. The plates 133 are adjustably mounted on the base 10 by means of set screws which pass through elongated slots 137 formed therein. The slots in the various members are so positioned that the cam plates can be adjusted in practically any direction with respect to the table. The cam plates 126 and 128 may thus be adjustably fixed with respect to the path of movement of the follower 120.

The member 28 is urged in a counterclockwise direction, (viewing Fig. 2) by means of a compression spring 136, which is received within a bare 138 provided in the member 24. The spring acts against a depending pin 140, which is fixed to the plate 28 and depends within an enlarged aperture 142 provided in the member 24. With the spring urging the member 28 to move in a counterclockwise direction with respect to the member 24 (viewing Figure 2), the pin 108 acts on one side of the recess 106, through the block 112, to urge the follower 120 outwardly or in a clockwise direction (viewing Fig. 2). The follower may move outwardly until it engages one of the cam surfaces 122 or 124, or until the stop screw 116 engages the stop 118. Except for the times when the follower 120 is engaging the cam track 122 or 124, the set screw 116 engages the stop 118, and this may be termed the normal position of the member 28 with respect to the member 24. With the cutter properly positioned on the base circle of the worm, and with the cutter table positioned on the proper center distance, if the cutter were then actuated without using the cam plates 126 and 128, the cutter would follow the same contour as that on the formed worm. This movement is modified in order to obtain the end relief desired by the action of the cam plates 126 and 128.

With the cutter positioned as described above, and using the cam plates, as the cutter 96 approaches the entering side of the worm, the follower 120 is in substantially the position shown in Fig. 2. Roller 120 is then following the cam surface 122, and the action through the bell crank 101 is to move the plate 28 clockwise with respect to the plate 24. This positions the cutting edge 96 to take the deepest cut on the entering end of the worm thread and on the left-hand side of the thread. The cutter and the table 12 are moving in a clockwise direction to make the cut. As the follower 120 moves along the cam 122, such cam is of such a shape that the plate 28 moves in a counterclockwise direction relative to the member 24, so that the cutting edge 96 is retracted from its depth of cut. In this way, the amount of relief is gradually reduced toward the center of the worm. When the follower 120 reaches the space between cam plates 126 and 128, the cutting edge 96 is in its normal position with respect to the plate 24, so that no cutting action takes place on the center portion of the worm. When the follower 120 engages the cam edge 124, a clockwise relative movement is imparted to the member 28, which causes the cutting edge 96 to begin taking a cut in the worm thread, and such cut is progressively increased until the cutting tool 96 leaves the leaving end of the thread. It will be appreciated that the amount and contour of the relief may be varied by adjusting the cam plates or by changing the shape of the cam edges.

With the set-up above described, it will be appreciated that only one side of the thread is relieved. To relieve the other side of the thread, a cutter holder the same as the cutter holder 62 is provided which is of the opposite hand. The cutting tool is also of the opposite hand, and is positioned on the opposite side of the base circle, from that described above. The spindle 112 would be driven in a reverse direction from that described above, and the bell crank 101 would be reversed in its position, so that the follower 120 would follow the direction of rotation and engage the cam 128 first and then the cam 126, so that the relative movement would take effect when the cutter was in the proper position. The plate 58 may be adjustably fixed to the member 28 by releasing the clamp 62, turning the plate 58 to its proper position, and reclamping the rings 62. The cutting would then be repeated to provide the relief on the other side of the thread.

What is claimed is:

1. Apparatus for relieving the flanks of the thread of a worm of the globoidal type comprising, in combination, means for rotating a worm to be machined, means carrying a cutting tool adapted to pass through the thread of the worm, said last named means including a rotatable table and a tool supporting member mounted on said table for limited rotative movement with respect thereto about the axis of rotation of said table, means causing such relative movement, and means to effect timed rotation of said table with respect to the rotation of the worm.

2. Apparatus for relieving the flanks of the thread of a worm of the globoidal type comprising, in combination, means for rotating a worm to be machined, means carrying a cutting tool adapted to pass through the thread of the worm, said last named means including a rotatable table and a tool supporting member mounted on said table for limited rotative movement with respect thereto about the axis of rotation of said table, means causing such relative rotative movement at the flanks of the worm, and means to effect timed rotation of said table with respect to the rotation of the worm.

3. Apparatus for relieving the flanks of the thread of a worm of the globoidal type comprising, in combination, means for rotating a worm to be machined, means carrying a cutting tool adapted to pass through the thread of the worm, said last named means including a rotatable table, a tool supporting member mounted on said table for limited rotative movement with respect thereto about the axis of rotation of said table, means mounting said cutting tool with the cutting edge thereof tangent to the base circle of the worm, means causing such relative rotative movement, and means to effect timed rotation of said table with respect to the rotation of the worm.

4. Apparatus for relieving the flanks of the thread of a worm of the globoidal type comprising, in combination, means for rotating a worm to be machined, means carrying a cutting tool adapted to pass through the thread of the worm, said last named means including a rotatable table and a tool supporting member mounted on said table for limited rotative movement with respect thereto about the axis of rotation of said table, cam means causing such relative rotative movement, and means to effect timed rotation of said table with respect to the rotation of the worm.

5. Apparatus for relieving the flanks of the thread of a worm of the globoidal type comprising, in combination, means for rotating a worm to be machined, means carrying a cutting tool adapted to pass through the thread of the worm, said last named means including a rotatable table and a tool supporting member mounted on said table for limited rotative movement with respect thereto about the axis of rotation of said table, a pair of spaced cams mounted adjacent said table, a cam follower member operatively connected to said supporting member and adapted to engage said cams for causing such relative rotation, and means to effect timed rotation of said table with respect to the rotation of the worm.

6. Apparatus for relieving the flanks of the thread of a worm of the globoidal type comprising, in combination, means for rotating a worm to be machined, means carrying a cutting tool adapted to pass through the thread of the worm, said last named means including a rotatable table and a tool supporting member mounted on said table for limited rotative movement with respect thereto about the axis of rotation of said table, a pair of spaced cams mounted adjacent said table, a cam follower member operatively connected to said supporting member to engage said cams for causing such relative rotation, said cams being so positioned that said cutter moves axially of the table adjacent the flanks of the worm thread only and assumes its normal position in the travel between the cams, and means to effect timed rotation of said table with respect to the rotation of the worm.

7. Apparatus for relieving the flanks of the thread of a worm of the globoidal type comprising, in combination, means for rotating a worm to be machined, means carrying a cutting tool adapted to pass through the thread of the worm, said last named means including a rotatable table and a tool supporting member mounted on said table for limited rotative movement with respect thereto about the axis of rotation of said table, resilient means urging said table and said supporting member to their normal position with respect to each other, means acting against said resilient means during portions only of the travel of said table causing such relative movement, and means to effect timed rotation of said table with respect to the rotation of the worm.

HARRY PELPHREY.